United States Patent Office 2,839,556
Patented June 17, 1958

2,839,556

PRODUCTION OF ALUMINUM HYDROCARBONS

Karl Ziegler and Roland Koester, Mulheim an der Ruhr, Germany; said Koester assignor to said Ziegler No Drawing. Application July 27, 1953
Serial No. 370,655

Claims priority, application Germany July 28, 1952

29 Claims. (Cl. 260—448)

This invention relates to improvement in the production of aluminum hydrocarbons, and more particularly relates to the production of aluminum trialkyls or aluminum triaryls along with cryolite and aluminum fluoride.

Aluminum hydrocarbons have obtained importance as catalysts for the polymerization of olefins, and there exists a pronounced need for commerically convenient methods for their production. A number of proposals have been made in recent time, but all of them were not fully satisfactory.

In the two processes of the patent applications 354,-626, filed May 12, 1953, now U. S. Patent No. 2,744,127, and 354,658, filed May 12, 1953, now U. S. Patent No. 2,691,668, of the applicants, organic halogen compounds are directly reacted with magnesium-aluminum alloys with the production of aluminum trialkyls, or aluminum is at first dissolved in alkyl halides to give the liquid so-called aluminum alkyl sesquihalides which are dehalogenated by a subsequent treatment with magnesium or magensium-aluminum alloys, thereby setting free a part of the aluminum charged in the metallic form. In this process, the magnesium used is lost, at the end of the process, in the form of practically useless magensium halide.

In the process of the patent application 354,624, filed May 12, 1953, now U. S. Patent No. 2,786,860, of the applicants, alkali metal hydrides are necessary as essential auxiliary agents for the production of the aluminum alkyls. These alkali metal hydrides must be separately produced and have properties which render their commercial use difficult.

One object of this invention is the production of aluminum hydrocarbons without the above-mentioned disadvantages.

A further object of this invention is a process for the production of aluminum hydrocarbons which allows a commercially simple mode of operation.

A still further object of this invention is a process for the production of aluminum hydrocarbons which does not result in the formation of useless waste products, but simultaneously produces useful by-products, such as purely inorganic fluorine-containing aluminum compounds, such as cryolite, potassium aluminum fluoride, or aluminum fluoride in a form which is directly suitable for further use, as, for example, for the production of aluminuum. These, and still further objects will become apparent from the following description:

In accordance with the invention, aluminum hydrocarbons, and particularly aluminum trialkyls or aluminum triaryls, are produced in addition to purely inorganic aluminum fluorine compounds by reacting aluminum alkyl halides or aluminum aryl halides with alkali fluorides which may partially be present in the form of their complex compounds with aluminum fluoride.

In the process of the invention, there are obtained as by-products either cryolite or potassium-aluminum fluoride, respectively, depending on whether sodium fluoride or potassium fluoride, respectively, have exclusively been used as reagents. Aluminum fluoride is produced if a part of the alkali fluoride had been replaced by the complex compound thereof with aluminum fluoride. The process may be represented by the folowing reactions:

(1) Aluminum alkyl fluorides or aluminum aryl fluorides may readily be formed from the corresponding aluminum alkyl or aluminum aryl halides other than fluorides by reaction with alkali fluorides or aluminum fluoride alkali fluoride complex compounds. When using the complex compounds of the alkali fluoride for the reaction, aluminum fluoride is set free.

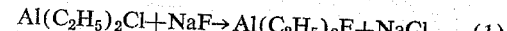
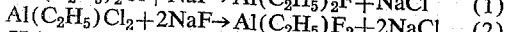
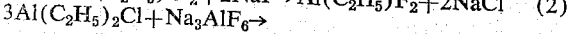

$$Al(C_2H_5)_2Cl + NaF \rightarrow Al(C_2H_5)_2F + NaCl \quad (1)$$
$$Al(C_2H_5)Cl_2 + 2NaF \rightarrow Al(C_2H_5)F_2 + 2NaCl \quad (2)$$
$$3Al(C_2H_5)_2Cl + Na_3AlF_6 \rightarrow$$
$$3Al(C_2H_5)_2F + AlF_3 + 3NaCl \quad (3)$$

If desired, these new alkyl- and fluorine-containing aluminum compounds may easily be obtained in the pure form in this phase of the reaction, for example, by vacuum distillation. They are generally very viscous, spontaneously inflammable liquids, which, in coldness, are often of a resin-like viscosity.

(2) The aluminum alkyl fluorides or aluminum aryl fluorides disproportion in the presence of suitable amounts of alkali fluoride at elevated temperatures to give complex alkali-aluminum fluorides, such as cryolite or "potassium cryolite," on the one hand, and aluminum trialkyls or aluminum triaryls, respectively, on the other hand, according to the following equations:

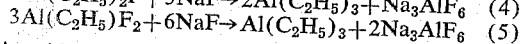

$$3Al(C_2H_5)_2F + 3NaF \rightarrow 2Al(C_2H_5)_3 + Na_3AlF_6 \quad (4)$$
$$3Al(C_2H_5)F_2 + 6NaF \rightarrow Al(C_2H_5)_3 + 2Na_3AlF_6 \quad (5)$$

It is evident from the foregoing that the production of aluminum trialkyls or aluminum triaryls may at will be coupled with the production of cryolite or "potassium cryolite," respectively, and/or of aluminum fluoride. In the course of a commercial production of aluminum trialkyls or aluminum triaryls, several or many charges are ordinarily reacted in succession. If in all batches alkali fluoride is exclusively used as one reactant, then cryolite or "potassium cryolite" will be the by-product. It is possible in this case to combine the reactions characterized by the Equations 1 and 2, one the one hand, and by the Equations 4 and 5, on the other hand, into one operation without intermediately isolating the aluminum alkyl fluorides.

Another possibility is to use alkali fluoride only in the first charge, and then to react in the second batch, according to Equation 3, the aluminum alkyl halide with the cryolite obtained at the end of the first charge. In this case, if aluminum fluoride itself is to be obtained as by-product, it is necessary, after the termination of Reaction 3, to first separate the organic aluminum fluorides. This is possible by dissolving out the same with indifferent solvents and filtration, or by vacuum distillation. Thereafter the Reactions 4 or 5 may be effected after the addition of alkali fluoride. When repeating this procedure, any such charge obviously gives aluminum fluoride in the first stage and the cryolite at the end of the second stage, the cryolite being used for the beginning of the next batch. In total, only aluminum fluoride is thus obtained as the by-product, apart from the last charge at the end of the production. The total consumption of alkali fluoride in this case is naturally only half that of the production of by-product cryolite.

It is evident that it is possible by suitably guiding the process to obtain by-product aluminum fluoride and by-product cryolite in any proportion desired.

In these different process modifications, aluminum fluoride is always, and the cryolite is in certain embodiments, obtained in mixture with alkali halides, such as sodium chloride, alkali bromide, or alkali iodide. The processing of such mixtures is effected in a very simple manner by treating them with water, preferably after a previous calcination, which improves the filtering property. The difficultly soluble aluminum fluorine compounds are then recovered by filtration.

The second stage of the reaction as represented by Equations 4 and 5, respectively, i. e., the reaction of the aluminum alkyl fluorides with sodium fluoride, has been found to proceed via novel complex compounds of alkali fluoride and aluminum alkyl fluoride according to the following equations:

$$3Al(C_2H_5)_2F + 3NaF \rightarrow 3NaAl(C_2H_5)_2F_2 \quad (6)$$
$$3NaAl(C_2H_5)_2F_2 \rightarrow 2Al(C_2H_5)_3 + Na_3AlF_6 \quad (7)$$

In the last stage, the final products, aluminum trialkyl and cryolite, are formed with the cleavage of the intermediately formed sodium-aluminum-diethyl-difluor complex compound. The reaction of aluminum alkyl difluoride with sodium fluoride according to Equation 5 proceeds likewise via a second stage with the formation of a novel complex compound of alkali fluoride and aluminum alkyl fluoride in accordance with the following equations:

$$Al(C_2H_5)F_2 + NaF \rightarrow NaAl(C_2H_5)F_3 \quad (8)$$
$$3NaAl(C_2H_5)F_3 + 3NaF \rightarrow Al(C_2H_5)_3 + 2Na_3AlF_6 \quad (9)$$

However, this process is by far more unfavorable, since more alkali fluoride must be charged, and, as the final result, only half the quantity of aluminum hydrocarbons, but double the quantity of cryolite is obtained as compared with the yields of the aforementioned process with the use of aluminum dialkyl monochloride.

It has been found that when using aluminum alkyl dichlorides and aluminum aryl dichlorides in the process according to the invention, the quantity of solid salts forming at first in the course of this process, as is obvious from the equations, is substantially larger than when starting with aluminum dialkyl monohalides and aluminum diaryl monohalides, respectively, as the initial material. In addition, the corresponding heats of reaction to be removed are much greater. Therefore, in the first case, a higher expenditure with respect to the quantities of solvent which may have to be added, to the size of the reaction spaces, etc., is required for carrying out the process according to the invention. These difficulties, which will naturally also arise to a certain extent when using as starting materials the so-called aluminum alkyl sesquichlorides and aluminum aryl sesquichlorides, respectively (mixtures of $RAlX_2$ and $R_2AlX$, where R is alkyl or aryl, X is chlorine, bromine or iodine), may be avoided if in the process according to the invention the mixture of the aluminum alkyl sesquichlorides and aluminum aryl sesquichlorides, respectively, is at first completely converted with a previously prepared portion of aluminum trialkyl and aluminum triaryl, respectively, into three molecules of the aluminum dialkyl monochloride, which is particularly suitable to the reaction. This conversion may proceed, for example, in accordance with the following equation:

$$Al(C_2H_5)Cl_2 + Al(C_2H_5)_2Cl + Al(C_2H_5)_3 \rightarrow 3Al(C_2H_5)_2Cl \quad (10)$$

In the further processing, as is evident from equation 7, double the quantity of the aluminum trialkyl or aluminum triaryl charged is recovered.

The aluminum trialkyl and aluminum triaryl, respectively, formed by the process according to the invention is extremely easily separated from the reaction mixture either by distillation or by dissolving in a suitable solvent.

In detail, the process for the preparation of aluminum hydrocarbons together with cryolite or aluminum fluoride may be effected in various different modes. For example, it may be preferable to operate in the presence of a solvent or suspending agent in order that the forming salt masses do not become too compact and remain stirrable and easily movable, especially in the first and second stages.

Suitable solvents are in principle all materials to which the reactants used, and especially the aluminum trialkyls or aluminum triaryls formed are resistant up to the operating temperature required, such as hexane, benzene, toluene, chlorobenzene, o-dichlorobenzene or phenanthrene.

If all of the three stages are carried out in the presence of a solvent, there should be selected a solvent which has a sufficient difference in boiling point from the aluminum trialkyls or aluminum triaryls to be produced. Aluminum triethyl, for example, boils at 196° C. Therefore, there should be selected a solvent, the boiling point of which is either not substantially above 150° C. or not below about 300° C. The difference in boiling point may be still smaller if a corresponding expenditure in equipment for separating the solvents and the reaction product by distillation is allowable. If low boiling solvents are selected, the third stage must be operated under pressure. If it is intended to use the aluminum trialkyl or aluminum triaryl only in solution, one will not be subjected to these limitations with respect to the boiling point of the solvent.

According to a special embodiment of the process of this invention, increased yields of aluminum hydrocarbons may be obtained if the thermal decomposition, as described in Equation 7 and the separation of the aluminum hydrocarbons are combined in a single process in such a manner that the aluminum hydrocarbons formed remain only as short as possible a time in the heated reaction zone. In carrying out this modification of the process, it is even possible to use a higher decomposition temperature than would generally be allowable by the thermal resistance of the aluminum hydrocarbons. In this way, the process can be greatly shortened in many cases. The execution of the process may most conveniently be realized by heating the products of the reaction between aluminum alkyl halides of aluminum aryl halides and alkali fluorides obtained at moderate temperatures, after previously having driven off the solvents which may have been used, under vacuum at temperatures of between 200° and 300° C. and taking care, by the use of pumps of proper capacity, that as high as possible a vacuum is continuously maintained in the apparatus. The requirements with respect to pumping capacity will increase with the size of the alkyl or aryl radicals combined with the aluminum.

It should be noted, for example, that as low a vacuum as may be produced by means of ordinary water-jet vacuum pumps will be sufficient in the production of the aluminum trimethyl. The splitting temperature may be increased in this case to as high as 270°–300° C. In spite of these high temperatures, aluminum trimethyl is obtained in a very high and practically quantitative yield.

This specific embodiment of the process of the invention may be carried out without the use of vacuum or with the use of only a slight vacuum if heated in different gas currents, preferably superheated vapors of liquids which are indifferent to the aluminum alkyls or aluminum aryls are used as the heat transferring media while taking care, by properly selecting the boiling point of these liquids, that the aluminum hydrocarbons obtained may easily be separated from the heat-transferring media. For example, superheated vapors of benzene, pentane, hexane or also butane have been found to be very suitable.

To effect these process modifications, it is possible, for example, to simply pass the vapors of the above-mentioned liquids after previous superheating to 200°–300° C. into the reaction vessels in which the solid salt-like products of the process, especially the complex compounds of the formula $NaAlR_2F_2$ where R is alkyl or aryl, are contained, while the reaction vessels are likewise heated to a temperature sufficient to prevent condensation of the vapors and allow the reaction products to actually reach the splitting temperatures required. The escaping superheated vapors are condensed, preferably with the use of heat exchangers for the evaporation of the freshly charged portions, and freed from the aluminum hydrocarbons carried along by distillation. The auxiliary liquids are returned into the process. It is also convenient to condense the aluminum hydrocarbons, which boil at a higher temperature than the heat-transferring media, by partial condensation as liquid.

This modification of the process may with excellent success be carried out in the so-called fluid bed, thus very easily permitting continuous operation.

The advantage of the process described over the known processes described at the beginning of the specification consists in that in addition to the desirable aluminum trialkyls or aluminum triaryls the commercially known fluorine compounds of aluminum, i. e., cryolite or aluminum fluoride, are obtained as by-product in the form of utilizable commercial products which are of importance in the electrolytic production of aluminum.

To obtain high yields and to secure a smooth course of reaction, care should be taken for the following: If the operation is directed at cryolite or "potassium cryolite" as the by-product, the quantity of alkali fluoride must be exactly equivalent to twice the halogen contained in the aluminum alkyl or aluminum aryl halide used. An excess of alkali fluoride should be avoided, if possible, or kept within very narrow limits, since aluminum trialkyls and aluminum triaryls have been found to form very stable non-distillable complex compounds with alkali fluorides. The composition of such complex compounds being, for example, $NaAlX_3F$ where X is alkyl or aryl. However, in the process phase as described, for example, by Equation 3, one is not bound to this condition of equivalents, and excess complex fluoride may be used. In this case, however, the condition of equivalents must again be preserved in Equation 4 or 5.

When producing aluminum trialkyls or aluminum triaryls in the manner described above with the recovery of aluminum fluoride as the by-product, the quantity of cryolite obtained in accordance with, for example, Equation 4 corresponds exactly to the quantity required in accordance with Equation 3 if the sequence of reactions is continued. When operating with exactly the molar ratios corresponding to Equation 3, the concentration of the two reactants, for example aluminum diethyl chloride and cryolite, will diminish very much toward the end of the reaction. This results in a decrease of the reaction rate which is the greater since a reaction between a liquid (possibly dissolved) and a solid material is involved. It is obvious, therefore, that the complete conversion of the cryolite will offer certain difficulties and will take a very long time under certain circumstances.

However, these difficulties may easily be overcome by a further modification of the process, namely if the conversion between cryolite and aluminum alkyl halide or aluminum aryl halide is carried out in two or several stages in such a manner that the reaction, with the conversion being still incomplete, is interrupted if the reaction rate becomes too slow. In this phase the organic aluminum compounds, whether by dissolution or by distillation, are separated from the solid phase. Then, the solid phase which is not yet completely converted is treated with fresh aluminum alkyl halide and aluminum aryl halide, respectively, thereby obtaining rapidly the complete conversion into aluminum fluoride and sodium chloride, while the unconverted organic aluminum compounds are further converted with fresh cryolite.

It is obvious that also such a process may be carried out in an uninterrupted sequence of individual operations, which, with the sole use of, for example, aluminum diethyl monochloride and the corresponding quantity of sodium fluoride, permits the following molecular equation to be realized:

$3Al(C_2H_5)_2Cl + 3NaF \rightarrow AlF_3 + 3NaCl + 2Al(C_2H_5)_3$ (11)

The aluminum alkyl or aryl fluorides, as, for example, are produced in accordance with Reactions 1, 2, and 3, and the alkali metal aluminum alkyl or aryl fluorides are novel compounds and constitute valuable intermediates for the production of the aluminum trialkyls or triaryls and the cryolites, etc.

The new aluminum alkyl or aryl fluorides have the general formula:

$$AlR_xF_y$$

in which R is a radical, selected from the group consisting of alkyl and aryl radicals, and x is one and y the other of the numbers 1 and 2. Preferable among these novel intermediates are aluminum diethyl fluoride $Al(C_2H_5)_2F$ and aluminum monoethyl difluoride $$Al(C_2H_5)F_2$$

The novel complex compounds with the sodium or potassium alkali metals have the general formula $MeAlR_aF_b$, in which Me is an alkali metal selected from the group consisting of sodium and potassium, R is a radical selected from the group consisting of alkyl and aryl radicals, a is one of 1 and 2, and b is one of 2 and 3, which, added to a, will equal 4. Preferable among these novel complexes is sodium aluminum diethyl difluoride $NaAl(C_2H_5)_2F_2$ and sodium aluminum ethyl trifluoride $NaAl(C_2H_5)F_3$.

The following examples are given by way of illustration and not limitation:

Example 1

120.5 grams aluminum diethyl chloride are dissolved under nitrogen in 200 cc. of dry hexane and then 42 grams of finely pulverized and previously well dried sodium fluoride are added to the solution while stirring the same. The mixture will heat up and the hexane boil if the addition is effected rapidly. The stirring is continued for about 1 hour and the hexane is then distilled off. The residue is further heated under high vacuum and the highly viscous aluminum diethyl fluoride distils off at a pressure of 1–2 mm. and a temperature of between 90° and 100° C. The yield is nearly quantitative.

104 grams of the monofluoride obtained are intimately mixed under nitrogen with 42 grams of finely pulverized and dried sodium fluoride and heated for 3 hours at 180°–190° C. Then the aluminum triethyl formed is distilled off under vacuum. The yield is 65–70 grams of aluminum triethyl having a boiling point of 128°–130° C. at 50 mm. Pure cryolite remains as residue in the distilling apparatus.

Instead of aluminum diethyl chloride, aluminum diethyl bromide may be used with the same success for this example.

Example 2

92 grams of aluminum dimethyl chloride are dissolved in 200 cc. of benzene, mixed with 84 grams of sodium fluoride (both steps under nitrogen) and the mixture is then heated for 5 hours at 180° C. in a horizontal autoclave which is arranged so that it may be rotated. In addition, some sharp-edged pieces of metal, such as some pieces of hexagonal steel cut to a size at which their length equals their diameter are placed in the autoclave for the purpose of comminuting the salt masses suspended in the benzene during the rotating motion of the autoclave. The autoclave is cooled, the liquid portion of the contents of the autoclave is forced through a filtering device under nitrogen and the salt masses substantially remaining in the autoclave are washed two times with benzene with subsequent pressing off of the liquid. All of the combined benzene solutions are freed under nitrogen from benzene in a column, thereby obtaining as residue 80–90% of the theoretical yield of aluminum trimethyl. The purification is expediently effected by means of vacuum distillation. The solid salt masses remaining in the autoclave and in the filtering device are decomposed with water and freed from residual benzene by injecting steam. In this way there results cryolite suspended in a sodium chloride solution from which the cryolite is easily recovered by centrifuging and washing with water and subsequent drying.

Example 3

100 kilograms of commercial phenanthrene which had previously been purified by prolonged melting together with sodium with heating and by distillation were placed in a suitable stirring vessel followed by the addition of 100 liters of toluene and 25.2 kilograms of finely pulverized and dried sodium fluoride. The free space of the reaction vessel is filled with nitrogen and then 24.7 kilograms of aluminum ethyl sesquichloride are carefully allowed to drop in while preventing excessive heating by properly controlling the addition and externally cooling. Then the solution is boiled while stirring the same, and the toluene is distilled down by means of a short column until the contents of the vessel show a temperature of 180°–190° C. At this moment the descending cooler is replaced by a reflux condenser and the heating is continued for further 5–6 hours at 180°–200° C. while stirring. This is followed by distillation in a column under vacuum. At first, certain portions of toluene escape, then about 10 kilograms of aluminum triethyl pass over, which are finally mixed with some phenanthrene. The distillation is continued until 5 kilograms of the originally present 100 kilograms of phenanthrene have distilled over. These 5 kilograms of phenanthrene still contain aluminum triethyl and are, after being combined with the main fraction of aluminum triethyl, again fractionated in vacuo, thereby completely separating the phenanthrene from the aluminum triethyl.

The residue remaining in the stirring vessel is allowed to cool somewhat and then the toluene distilled off is again added while stirring. The toluene at this temperature (70°–80° C.) dissolves all of the phenanthrene, and it is now possible, by transferring the total contents of the vessel into a suitable filtering device, to easily separate the salts from the solvents and to subsequently wash the salts free from phenanthrene with toluene. The mother liquor is directly passed to the next batch. It is preferable, prior to the addition of the aluminum ethyl sesquichloride, to distil off at first sufficient toluene as to obtain the initial state of the first experiment. In doing so, certain portions of atmospheric oxygen and moisture obsorbed during the filtration of the salt masses are removed. Then the phenanthrene recovered in the second distillation of the aluminum triethyl is added, and the next experiment is ready to start.

The salt masses are worked up in exactly the same manner as described in Example 1, and processed into pure cryolite, which results in a quantity of 20–21 kilograms.

The phenanthrene has been selected in this case only as an example of a high-boiling solvent which is completely indifferent to aluminum triethyl. It may be replaced by any other solvent having the same properties. Aromatic halogen compounds, such as chlorinated diphenyl, are also suitable as high-boiling solvents of this kind.

Example 4

61 grams of aluminum-butyl-sesqui-iodide as is easily obtained from aluminum chips and butyl iodide are dissolved in 100 cc. of o-dichlorobenzene and mixed with 25.2 grams of sodium fluoride. Following this, the solution is boiled for 6 hours. Thereafter, it is filtered under nitrogen from the separated salts, these salts are washed with some dichlorobenzene, the dichlorobenzene is distilled off under vacuum by means of a column, and the residue is rectified under high vacuum. About 15 grams of aluminum tributyl are obtained.

Example 5

29.5 grams of aluminum-phenyl-sesqui-iodide produced according to "Journal Organic Chemistry," 5, 114–118 (1940), are refluxed under nitrogen for 5 hours in 100 cc. of a completely hydrogenated Fischer-Tropsch diesel oil fraction boiling between 190° and 200° C. together with 12.6 grams of sodium fluoride, or are shaken in a closed vessel under the same conditions. The mixture is filtered hot with the exclusion of air and the diesel oil is distilled off under vacuum, thereby obtaining as residue about 10 grams of aluminum triphenyl, which at once crystallizes and may be recrystallized with the exclusion of air from hot chlorobenzene with the addition of some petroleum ether.

The separation of the cryolite in the Examples 4 and 5 is possible in the same manner as in the other examples.

Example 6

In a vessel of 15 liters capacity provided with a double-wall jacket and the other mountings required, a suspension of 2.8 kilograms of dry and finely pulverized commercial sodium fluoride in 6 liters of chlorobenzene is heated under reflux until it boils, and 4.2 kilograms of aluminum diethylchloride are allowed to flow in within half an hour. During this phase of the experiment, the external heating is shut off since the reaction heat is sufficient to maintain the reaction mixture in a lively boiling state. Following this, the mixture is stirred for 10 hours at the boiling temperature of the mixture. Thereafter, the chlorobenzene is distilled off as completely as possible with the use of a short column under a vacuum of 10–20 mm. at a temperature of the bath beginning with 70° C., and finally increased to 130° C. (temperature of the heat-transferring medium in the double-wall jacket). Now the column is replaced by as short as possible a still head. During this operation, the admittance of air is to be excluded by suitable means, as, for example, by introducing nitrogen. The still head is connected via a cooler and a receiver to an oil-air pump which stirs as vigorously as possible. The following measures comprise evacuating to a pressure of below 1 mm., if possible, and gradually heating to a final temperature of 230° C. During this time, 2.6 kilograms of aluminum triethyl corresponding to 97% of the theory distil off.

Example 7

Substantially the same experiment as described in Example 6 is carried out, using 3.25 kilograms of aluminum dimethylchloride instead of the ethyl compound. At the end of the experiment, a vacuum of 10–200 mm. is applied, but the heating is effected to 270°–300° C. 1.6 kilograms of aluminum trimethyl, corresponding to 95% of the theory, are obtained.

Example 8

This experiment is at first carried out exactly as described in Example 6 until to that point where in Example 1 the heating under vacuum would start. Then the reaction vessel is connected via a steam superheater to a distilling vessel in which 10 kilograms of benzene are contained. The temperature in the jacket of the reaction vessel is adjusted to 200°–250° C. and the temperature of the benzene vapors introduced into the reaction vessel to 250°–300° C. The reaction vessel is connected to a suitable descending cooler which condenses the benzene vapors together with the aluminum triethyl formed. The two products are separated by distillation and the benzene recovered, if required, is repeatedly used for the same purpose until the decomposition of the complex aluminum-organic intermediate compound is a complete one. This is normally the case after 2 to 3 cycles.

Example 9

1.2 kilograms of the finely ground solid salt-like complex compound $NaAl(CH_3)_2F_2$ are filled with the exclusion of air into a tube of 15 cm. diameter and 1 m. length, which is provided at the base with a suitable sieve plate. The tube is externally heated over the whole length to 250°–300° C. and pentane vapors from a small vessel filled with pentane under pressure are passed in from below. The pentane vapors are at first passed through a superheater, where they are superheated to 250°–300° C. The rate of introduction is adjusted in such a manner that a good fluidized bed develops within the salt mass. The effluent vapors are cooled and the pentane is subsequently separated from the aluminum trimethyl by distillation. The pentane is returned into the process. Aluminum trimethyl is obtained in an almost quantitative yield.

By connecting several of such tubes in series, the process may easily be made a continuous one. In doing so, the complex compound is continuously charged to the first tube, while the finished decomposed residue of cryolite is withdrawn from the last tube.

The complex compound $NaAl(CH_3)_2F_2$ required for this example is very easily prepared by heating aluminum dimethylchloride with the equivalent quantity of sodium fluoride in boiling chlorobenzene, separating the sodium chloride formed by filtration, and once again heating with the same quantity of sodium fluoride, and finally distilling off the chlorobenzene. It is also possible, however, to use with the same success for the process described in this example the solid salt mixture which is obtained by boiling aluminum dimethyl chloride in chlorobenzene with 2 mols of sodium fluoride and subsequently distilling off the chlorobenzene.

We claim:

1. Process for the production of organic aluminum compounds selected from the group consisting of lower aluminum trialkyls and aluminum triphenyl, which comprises heating an organic aluminum fluoride selected from the group consisting of lower aluminum alkyl fluorides and aluminum phenyl fluorides with an alkali metal fluoride and recovering an alkali aluminum fluoride and an organic aluminum compound selected from the group consisting of lower aluminum trialkyls and aluminum triphenyl.

2. Process according to claim 1, in which said alkali metal fluoride is selected from the group consisting of sodium fluoride and potassium fluoride.

3. Process according to claim 1, in which said heating is effected in the presence of an inert solvent having a different boiling point from the boiling point of the organic aluminum compound recovered.

4. Process for the production of one of a group consisting of lower aluminum trialkyls and aluminum triphenyl, which comprises heating an organic aluminum halide selected from the group consisting of chlorides, bromides and iodides of lower aluminum alkyls and aluminum phenyls with a member selected from the group consisting of alkali metal fluorides and alkali metal aluminum fluorides to thereby form an organic aluminum fluoride selected from the group consisting of lower alkyl and phenyl aluminum fluorides, thereafter heating said organic aluminum fluoride with an alkali fluoride and recovering an alkali aluminum fluoride and an organic aluminum compound selected from the group consisting of lower aluminum trialkyls and aluminum triphenyl.

5. Process according to claim 4, in which said alkali metal is a member selected from the group consisting of sodium and potassium.

6. Process according to claim 4, in which said organic aluminum halide is heated with an alkali aluminum fluoride produced by the heating of organic aluminum fluoride with alkali fluoride.

7. Process according to claim 6, in which aluminum fluoride is recovered after said heating of organic aluminum halide with said alkali aluminum fluoride.

8. Process according to claim 4, in which said organic aluminum halide is in the form of a mixture of aluminum monoalkyl halides and aluminum dialkyl monohalides.

9. Process according to claim 8, in which said mixture of monoalkyl halides and dialkyl monohalides are reacted with aluminum trialkyls to thereby form aluminum dialkyl halides prior to said heating.

10. Process according to claim 4, in which said organic aluminum fluorides are recovered by vacuum distillation.

11. Process according to claim 4, in which said organic aluminum halide is heated with an alkali aluminum fluoride and in which said organic aluminum fluoride is recovered from the reaction mixture, the residual solid phase calcined, the alkali halide dissolved out in water, and aluminum fluoride recovered.

12. Process according to claim 4, in which said organic aluminum halide is an aluminum phenyl.

13. Process according to claim 4, in which said organic aluminum compounds are recovered by dissolving with organic solvents.

14. Process according to claim 4, in which said organic aluminum fluoride is heated under vacuum and in which said organic aluminum compound is rapidly recovered by distillation.

15. Process according to claim 4, in which said organic aluminum halide is heated with cryolite in at least two stages with a liquid phase poor in organic aluminum halide and rich is cryolite in one stage, and a mixture poor in cryolite is reacted with fresh aluminum halide in the other stage.

16. Process according to claim 4, in which said heating is effected in an inert solvent having a different boiling point from the boiling point of the recovered organic aluminum compound.

17. Process according to claim 16, in which the boiling-point difference is at least 50° C.

18. Process according to claim 17, in which said solvent is selected from the group consisting of aliphatic hydrocarbons, aromatic hydrocarbons, alkylated aromatic hydrocarbons, chlorinated aromatic hydrocarbons and condensed aromatic hydrocarbons.

19. Process for the production of one of a group consisting of lower aluminum trialkyls and aluminum triphenyl which comprises thermally decomposing an alkali metal organic aluminum fluoride complex selected from the group consisting of lower alkali metal aluminum alkyl fluorides and alkali metal aluminum phenyl fluorides in the present of an alkali metal fluoride and recovering an organic aluminum compound selected from the group consisting of lower aluminum trialkyls and aluminum triphenyl.

20. Process according to claim 19, in which said alkali metal is selected from the group consisting of sodium and potassium.

21. Process for the production of one of a group consisting of lower aluminum trialkyls and aluminum triphenyl, which comprises thermally decomposing an alkali metal organic aluminum fluoride selected from the group consisting of lower alkali metal aluminum dialkyl difluorides and alkali metal aluminum diphenyl difluorides and recovering an organic compound selected from the group consisting of lower aluminum trialkyls and aluminum triphenyl.

22. Process according to claim 21, in which said alkali metal is selected from the group consisting of sodium and potassium.

23. Process according to claim 21, in which said thermal decomposition is effected in the fluidized phase.

24. Process according to claim 23, in which said alkali organic aluminum fluoride is maintained fluidized in a super-heated inert vaporized solvent.

25. Process according to claim 1 in which said alkali metal fluoride is sodium fluoride and in which said alkali aluminum fluoride recovered is cryolite.

26. Process according to claim 1 in which said alkali metal fluoride is potassium fluoride, and in which said alkali aluminum fluoride recovered is potassium aluminum fluoride.

27. Process according to claim 4 in which said alkali fluoride is sodium fluoride and in which said alkali aluminum fluoride recovered is cryolite.

28. Process according to claim 4 in which said alkali fluoride is potassium fluoride and in which said alkali aluminum fluoride recovered is potassium aluminum fluoride.

29. Process for the production of one of a group consisting of lower aluminum trialkyls and aluminum triphenyl, which comprises contacting an organic aluminum fluoride selected from the group consisting of lower aluminum alkyl and aluminum phenyl fluorides with an alkali metal fluoride to thereby form an organic alkali metal aluminum fluoride selected from the group consisting of lower alkali metal aluminum alkyl fluorides and alkali metal aluminum phenyl fluorides, thereafter thermally decomposing said group member in the presence of an alkali metal fluoride and recovering an organic aluminum compound selected from the group consisting of lower aluminum trialkyls and aluminum triphenyl.

References Cited in the file of this patent

Report on A Survey of Chemical Literature Dictionary with Fluorine Containing Organic Compounds (June 15, 1943) Naval Research Defense Project. Dept. of Chem., North Carolina, pp. 101, 117, 202, 125, 291, 305.

Sidwick—Chemical Elements and Their Compounds, vol. 1, pp. 417–418 (1950).

Metallurgical Dictionary, Henderson, Reinhold Publishing Corp., N. Y., 1953, page 96.

U. S. DEPARTMENT OF COMMERCE
PATENT OFFICE

CERTIFICATE OF CORRECTION

Patent No. 2,839,556     Karl Ziegler et al.     June 17, 1958

It is hereby certified that error appears in the printed specification of the above numbered patent requiring correction and that the said Letters Patent should read as corrected below.

Column 1, line 15, for "improvement" read -- improvements --; column 7, lines 50 and 51, for "obsorbed" read -- absorbed --; column 10, line 31, for "is" read -- in --; line 51, for "present" read -- presence --.

Signed and sealed this 5th day of August 1958.

(SEAL)

Attest:
KARL H. AXLINE
Attesting Officer

ROBERT C. WATSON
Commissioner of Patents